United States Patent
Lin

(10) Patent No.: US 8,695,682 B2
(45) Date of Patent: Apr. 15, 2014

(54) PULL BAR DEVICE FOR A SUNSHADE ASSEMBLY

(75) Inventor: Paul Lin, Tainan (TW)

(73) Assignee: Macauto Industrial Co., Ltd., Tainan Hsien (TW)

( * ) Notice: Subject to any disclaimer, the term of this patent is extended or adjusted under 35 U.S.C. 154(b) by 104 days.

(21) Appl. No.: 13/410,346

(22) Filed: Mar. 2, 2012

(65) Prior Publication Data

US 2012/0222829 A1    Sep. 6, 2012

(30) Foreign Application Priority Data

Mar. 3, 2011    (TW) .............................. 100107124 A

(51) Int. Cl.
*B60J 1/20* (2006.01)
(52) U.S. Cl.
USPC .................................................... 160/370.22
(58) Field of Classification Search
USPC ............ 160/290.1, 23.1, 27, 28, 100, 370.22, 160/349.1
See application file for complete search history.

(56) References Cited

U.S. PATENT DOCUMENTS

| | | | | |
|---|---|---|---|---|
| 5,577,779 A * | 11/1996 | Dangel | ........................... | 292/80 |
| 5,653,277 A * | 8/1997 | Kerner et al. | ............ | 160/370.22 |
| 6,322,032 B1 * | 11/2001 | Su | ............ | 248/292.12 |
| 6,899,380 B2 * | 5/2005 | Kralik et al. | ................. | 296/214 |
| 6,986,434 B1 * | 1/2006 | Getsy et al. | ................. | 220/254.3 |
| 7,013,946 B2 * | 3/2006 | Beck et al. | ............... | 160/370.22 |
| 7,562,462 B2 * | 7/2009 | Gentleman et al. | ............. | 33/372 |
| 8,016,013 B2 * | 9/2011 | Horvath | ...................... | 160/23.1 |
| 8,141,832 B2 * | 3/2012 | Chak | ........................ | 248/226.11 |
| 2006/0162878 A1 * | 7/2006 | Lin | ......................... | 160/370.22 |
| 2007/0029058 A1 * | 2/2007 | Lin | ......................... | 160/370.22 |
| 2009/0178771 A1 * | 7/2009 | Lin | ......................... | 160/370.22 |
| 2013/0037295 A1 * | 2/2013 | Liang et al. | .................... | 174/50 |

* cited by examiner

*Primary Examiner* — Katherine Mitchell
*Assistant Examiner* — Johnnie A Shablack
(74) *Attorney, Agent, or Firm* — Dickstein Shapiro LLP

(57) ABSTRACT

A pull bar device includes a pull bar unit that is adapted to be connected to a shade member, and that has a hole-defining surface portion defining an engagement hole that is adapted to be engaged removably with a hook member, and a cushion unit that is connected to the pull bar unit, that is exposed from the engagement hole, and that is adapted for biasing resiliently the hook member to abut against the hole-defining surface portion.

3 Claims, 3 Drawing Sheets

PULL BAR DEVICE FOR A SUNSHADE ASSEMBLY

CROSS-REFERENCE TO RELATED APPLICATION

This application claims priority of Taiwanese Application No. 100107124, filed on Mar. 3, 2011.

BACKGROUND OF THE INVENTION

1. Field of the Invention

The invention relates to a pull bar device, more particularly to a pull bar device for a sunshade assembly.

2. Description of the Related Art

A sunshade assembly is used to block or obscure sunlight that would otherwise pass through a window. A conventional automobile sunshade assembly generally includes a shade member wound on a shaft that is mounted on a first side of a window, a pull bar coupled to a free end of the shade member and formed with a plurality of engagement holes, and a plurality of hook members mounted on a second side of the window that is opposite to the first side. To use the sunshade assembly, the pull bar is pulled toward the hook members such that the shade member is extended from the first side toward the second side of the window. Next, the engagement holes are engaged respectively with the hook members. To enable the hook engagement, each engagement hole must be configured to have a diameter sufficiently large. However, this could results in loose engagement between the engagement holes and the hook members, which could cause unpleasant noise attributed to shock and vibration from operation of the automobile and could even lead to accidental disengagement of the engagement holes from the hook members.

SUMMARY OF THE INVENTION

Therefore, the object of the present invention is to provide a pull bar device that can alleviate the abovementioned drawbacks of the prior art.

Accordingly, a pull bar device of the present invention is adapted to be connected to a shade member of a sunshade assembly and adapted to be engaged removably with a hook member of the sunshade assembly. The pull bar device comprises a pull bar unit adapted to be connected to the shade member and having a hole-defining surface portion that defines a engagement hole adapted to be engaged removably with the hook member, and a cushion unit connected to the pull bar unit, exposed from the engagement hole, and adapted for biasing resiliently the hook member to abut against the hole-defining surface portion of the pull bar unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
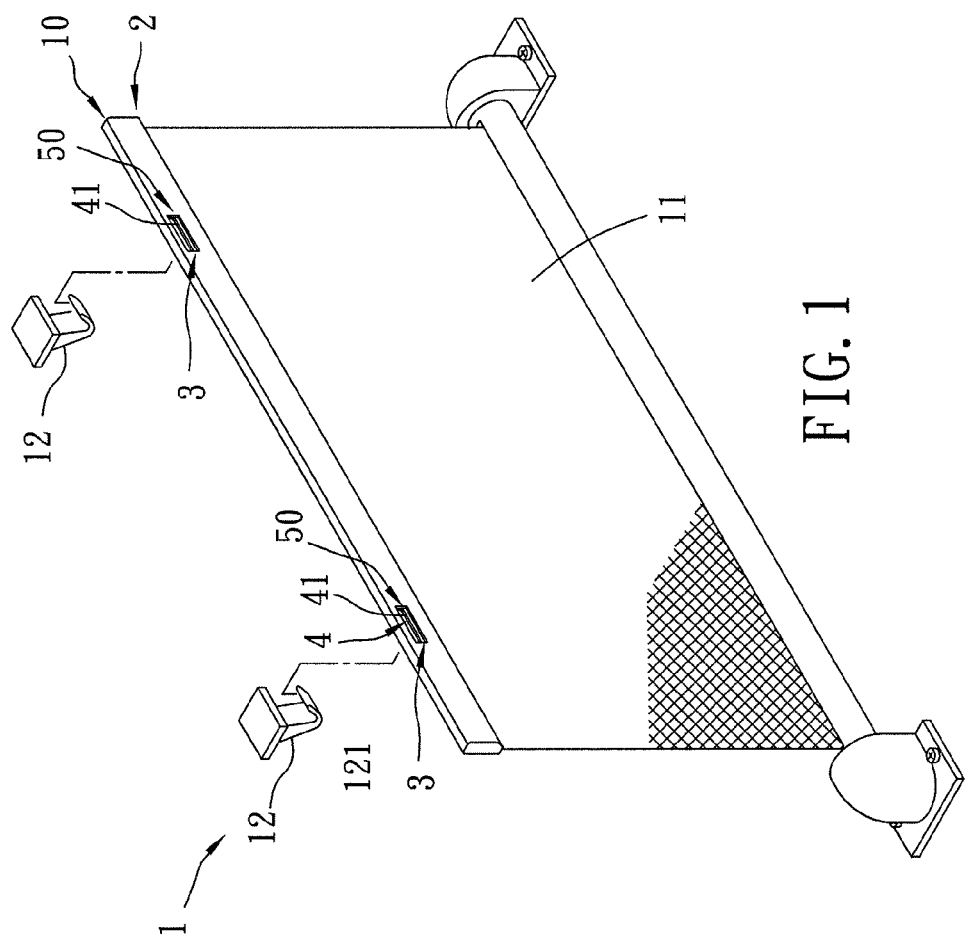
FIG. 1 is a partly exploded perspective view of a sunshade assembly mounted with a preferred embodiment of a pull bar device according to the invention.
Figure 2:
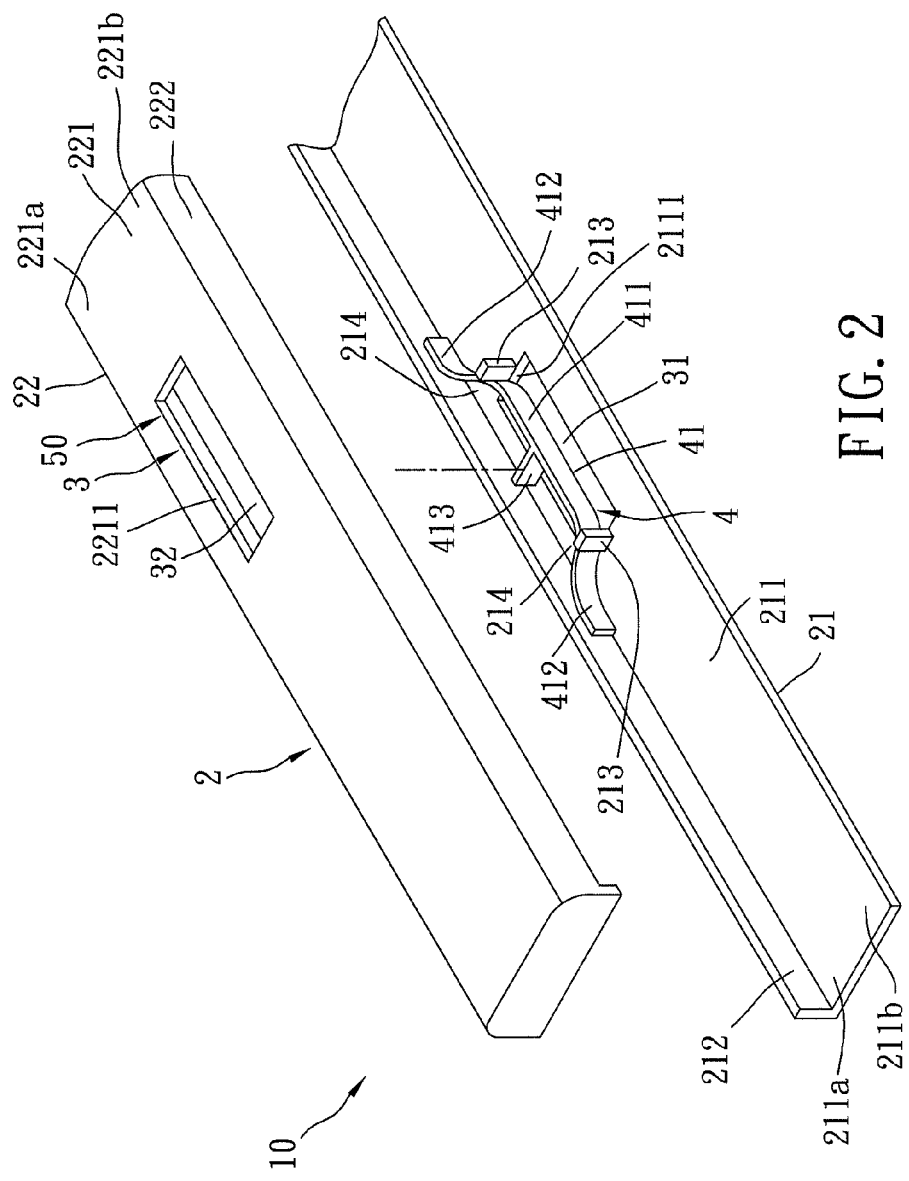
FIG. 2 is a fragmentary exploded perspective view of the preferred embodiment.
Figure 3:
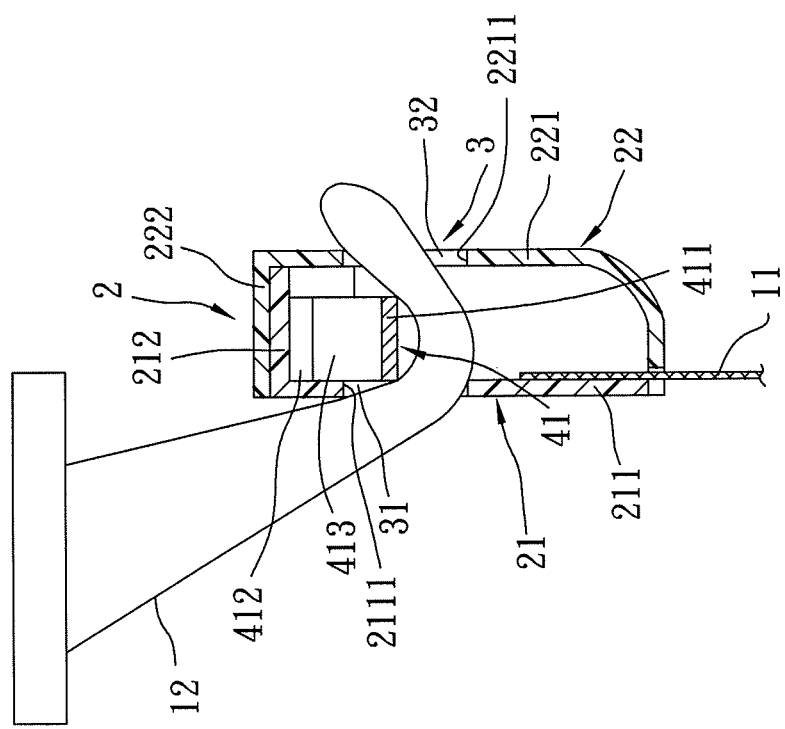
FIG. 3 is a sectional view of the preferred embodiment when engaged with a hook member.

As shown in FIGS. 1 to 3, the preferred embodiment of a pull bar device 10 according to the present invention is adapted to be connected to a shade member 11 of a sunshade assembly 1, and adapted to be engaged removably with a pair of hook members 12 of the sunshade assembly, which, in this embodiment, are disposed above the shade member 11. The pull bar device 10 includes a pull bar unit 2 and a cushion unit 4.

The pull bar unit 2 includes a first bar member 21 and a second bar member 22. The first bar member 21 includes a first base wall 211 extending in a left-right direction and having upper and lower parts 211a, 211b. The second bar member 22 includes a second base wall 221 extending in the left-right direction, spaced apart from the first base wall 211, and having upper and lower parts 221a, 221b that correspond respectively in position to the upper and lower parts 211a, 211b of the first base wall 211. The lower parts 211b, 221b are adapted to cooperate for holding an end portion of the shade member 11 therebetween. The first bar member 21 further includes a first side wall 212 interconnecting the upper parts 211a, 221a of the first and second base walls 211, 221, and two pairs of protrusions 213 extending from the first base wall 211 toward the second base wall 221. The second bar member 22 further includes a second side wall 222 extending from the lower part 221b of the second base wall 221 toward the lower part 211b of the first base wall 211, and cooperating with the lower part 211b together with the lower part 221b to clamp an end portion of the shade member 11 between the lower part 211b and the second side wall 222.

In this embodiment, the pull bar unit 2 has first and second hole-defining surface portions 50, each of which corresponds in position to a respective pair of the protrusions 213 and defines an engagement hole 3 adapted to be engaged removably with a respective one of the hook members 12. Each of the engagement holes 3 has an elongated first hole portion 31 formed in the first base wall 211 and formed between the respective pair of the protrusions 213, and an elongated second hole portion 32 formed in the second base wall 221, formed between the respective pair of the protrusions 213, and corresponding in position to the first hole portion 31. Each of the first and second hole-defining surface portions 50 has a first surface section 2111 disposed in the first base wall 211 and defining the first hole portion 31, and a second surface section 2211 disposed in the second base wall 221 and defining the second hole portion 32.

The cushion units 4 is disposed between the first and second base walls 211, 221 of the pull bar unit 2, and includes two resilient members 41 each corresponding in position to a respective one of the engagement holes 3. Each of the resilient members 41 is substantially U-shaped, and has an abutment portion 411 exposed from the first and second hole portions 31, 32 of the respective one of the engagement holes 3, and a pair of positioning portions 412 connected to opposite ends of the abutment portion 411. Each of the positioning portions 412 of each of the resilient members 41 is retained in a corresponding one of the receiving spaces 214. Each of the resilient members 41 further has a stop portion 413 disposed between the abutment portion 411 and the first side wall 212 for limiting resilient movement of the abutment portion 411 toward the first side wall 212.

To use the sunshade assembly 1, a user pulls the pull bar device 10 toward the hook members 12, and engages the hook members 12 with the pull bar device 10 by extending the hook members 12 through the engagement holes 3, respectively.

During the process, as each of the hook members 12 is extended into the corresponding engagement hole 3, the abutment portion 411 and the stop portion 413 of each of the resilient members 41 are pushed upwardly and resiliently by the corresponding hook member 12. Next, a restoring force of the abutment portion 411 biases the abutment portion 411 against the corresponding hook member 12, which in turn tightly and firmly abuts the corresponding hook member 12 against the corresponding hole-defining surface portion 50, thereby preventing occurrences of noise attributed to collisions between the hook members 12 and the pull bar unit 2, and preventing accidental disengagement of the hook members 12 from the pull bar unit 2. Moreover, in such a configuration, breaking of the abutment portion 411 due to over-deforming is prevented.

Although the pull bar device 10 is exemplified as having two of the engagement holes 3, the pull bar device 10 may be configured to have any number of the engagement holes 3 according to need.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A pull bar device adapted to be connected to a shade member of a sunshade assembly and adapted to be engaged removably with a hook member of the sunshade assembly, said pull bar device comprising:

a pull bar unit adapted to be connected to the shade member, and having a hole-defining surface portion that defines an engagement hole adapted to be engaged removably with the hook member, said pull bar unit comprising:

a first base wall having upper and lower parts, a second base wall spaced apart from said first base wall and having upper and lower parts that correspond respectively in position to said upper and lower parts of said first base wall, said lower parts of said first and second base walls being adapted to cooperate for holding an end portion of the shade member therebetween, a first side wall interconnecting said upper parts of said first and second base walls, and a pair of protrusions extending from one of said first and second base walls toward the other of said first and second base walls, each of said protrusions cooperating with said first side wall to define a receiving space therebetween;

said engagement hole has a first hole portion formed in said first base wall and formed between said protrusions, and a second hole portion formed in said second base wall, formed between said protrusions, and corresponding in position to said first hole portion;

said hole-defining surface portion has a first surface section disposed in said first base wall and defining said first hole portion, and a second surface section disposed in said second base wall and defining said second hole portion; and a cushion unit connected to said pull bar unit, exposed from said engagement hole, and adapted for biasing resiliently the hook member to abut against said hole-defining surface portion of said pull bar unit; said cushion unit comprising a resilient member exposed from at least one of said first and second hole portions of said engagement hole, and having opposite end portions that are retained respectively in said receiving spaces.

2. The pull bar device as claimed in claim 1, wherein said resilient member has:

an abutment portion exposed from the at least one of said first and second hole portions of said engagement hole, and adapted for biasing resiliently the hook member to abut against said hole-defining surface portion of said pull bar unit; and a pair of positioning portions connected to opposite ends of said abutment portion and retained respectively in said receiving spaces.

3. The pull bar device as claimed in claim 1, wherein said resilient member further has a stop portion disposed between said abutment portion and said first side wall for limiting resilient movement of said abutment portion toward said first side wall.

* * * * *